Oct. 25, 1949.   J. H. GODFREY   2,485,963
POWER-DRIVEN GLASS TRIMMER
Filed June 30, 1948
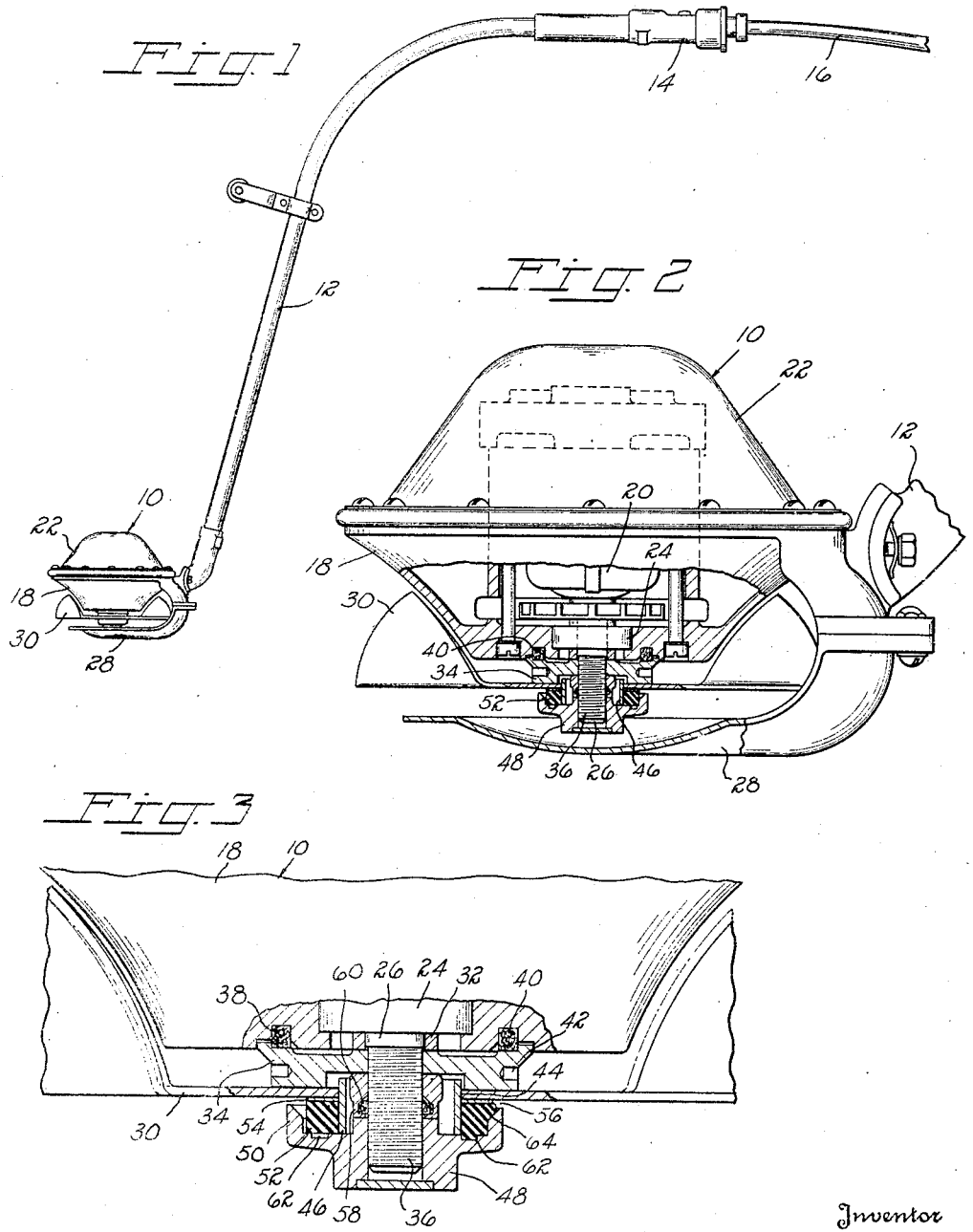
Inventor
JAMES H. GODFREY
By
Lindsey, Prutzman + Just
Attorneys Patented Oct. 25, 1949

2,485,963

UNITED STATES PATENT OFFICE 2,485,963

POWER-DRIVEN GRASS TRIMMER

James H. Godfrey, Berlin, Conn., assignor to The Stanley Works, New Britain, Conn., a corporation of Connecticut Application June 30, 1948, Serial No. 36,215

8 Claims. (Cl. 30—276)

1

This invention relates to improvements in power driven grass trimmers of the type shown, for example, in U. S. Patent No. 2,263,431, and more particularly to the means for connecting a blade to the motor driven shaft of such trimmers.

In using power driven grass shears, particularly those wherein the blade is directly connected to the rotating armature shaft of an electrically driven shears, when the blade strikes an obstacle such as a stone, a severe shock is imposed upon the bearings and the armature of said motor. Especially in grass trimmers which are driven at high rotational speed, some speeds being of the order of 7200 R. P. M., for example, such shock tends to score or Brinell the surfaces of the races of the bearings as well as embrittle and fracture the commutator connections of the armature. It can readily be envisioned that such undesirable functions can occur when the blade of a trimmer of this nature suddenly encounters an obstacle when the armature and blade are driven at such high rotational speeds.

It is an object of the present invention to provide connecting means between a blade and the shaft for driving the same in a grass trimmer of this nature, the connecting means being of such nature that shocks will be absorbed without deleterious action upon the bearings or armature of the motor of the trimmer. It is an aim of this object of the invention to permit limited tangential as well as radial movement of the blade relative to its driving shaft, such connection means also being of a nature which will restore the blade substantially to its normal position relative to the shaft following such limited movement therefrom occasioned by engagement of the blade with an obstacle.

Details of this object and the invention as well as other objects thereof are set forth in the following specification and illustrated in the accompanying drawing forming a part thereof.

In the drawing:

Fig. 1 shows a side elevation of a power driven grass trimmer of the type to which the present invention pertains.

Fig. 2 is an enlarged side elevation of the trimming head of the grass trimmer illustrated in Fig. 1, a portion of several parts of the head being shown in section to better illustrate details of the invention.

Fig. 3 is a still further enlarged portion of the trimmer head shown in Fig. 2, parts of this view also being shown in section to more clearly illustrate details of the invention.

2

Referring to the drawing, Fig. 1 illustrates a power and cutting head 10 of a grass trimmer from which a handle 12 projects, the outer end of said handle containing a switch 14 to which is connected a power conduit 16. The head 10 comprises a body 18 within which an electric motor 20 is mounted so that its armature shaft is normally disposed vertically. A cover 22 is mounted so as to enclose the motor and thus, in conjunction with the body 18, prevent trimmings from coming in contact with the motor. The motor is provided with spaced bearings mounted in opposite ends thereof, the lower bearing 24 being clearly shown in Figs. 2 and 3. The lower end of the armature shaft 26 depends substantially beyond the motor and body 18. A skid or shoe 28 is secured to the body 18 for purposes of permitting the trimmer to be moved over the surface being trimmed by a sliding action. The motion and position of the trimmer relative to the surface being trimmed is controlled by handle 12.

A blade 30 is secured to the shaft 26 by means comprising the principal feature of the present invention, details of which will now be described. The inner ball race 32 of lower bearing 24 is secured to shaft 26 by threadably attaching clamping member 34 to threads 36. Thus, clamping member 34 will rotate with shaft 26. The lower end of body 18 is preferably provided with a groove 38 in which is disposed a sealing gasket 40 of any suitable material, such as cork, felt, or the like, which engages a portion of the upper surface of clamping member 34 to prevent clippings and other extraneous material from entering the interior of body 18 from below. If desired, clamping member 34 may be provided with radial sockets 42 which may be engaged by a spanner wrench or the like by which the clamping member is threaded into tight engagement with the inner race 32.

Blade 30 is provided with an opening 44 which is materially larger in diameter than that of shaft 26 as can be readily seen from Figs. 2 and 3. Disposed within said opening is a preferably cylindrical sleeve 46, the interior diameter of which is also appreciably larger than that of shaft 26, but the engagement between the outer surface of said sleeve and the aperture 44 in the blade is preferably close. A lower or second clamping member 48 is also threaded onto the threaded end 36 of shaft 26. Said second clamping member 48 is provided at its periphery with an annular flange 50 to provide an annular space which receives resilient or yieldable means 52 which in the preferred embodiment of the invention comprises durable rubber shaped to resemble a washer.

The interior diameter of the yieldable means 52 is such as to closely engage the outer surface of sleeve 46. Disposed between the upper surface of yieldable means 52 and blade 30 is a metallic washer 54 preferably formed of soft brass or similar material.

As will be seen from Figs. 2 and 3, when the second clamping member 48 is threaded onto shaft 26, the yieldable means 52 will be forced into firm engagement with metallic washer 54 which in turn will be firmly and frictionally forced into engagement with blade 30. The size of the yieldable means 52 when comprising a rubber washer is such that when the second clamping member 48 is threaded into operative position relative to the yieldable means 52, washer 54, and blade 30, there will be a space 56 between the upper edge of flange 50 and the blade 30 as clearly shown in Fig. 3. If desired, an additional packing ring 58 containing packing material 60 may be provided to surround a portion of shaft 26 between clamping member 34 and second clamping member 48 as shown in Fig. 3 particularly.

Due to the provision of a space between the inner surface of sleeve 46 and shaft 26, as described above and illustrated in Figs. 2 and 3, when the blade 30 encounters an obstacle such as a stone, root, or the like, said blade may yield either tangentially, or radially, or both relative to shaft 26 since the yieldable means 52 which interengages the clamping means 48 and blade 30 may yield and be deformed as illustrated in Fig. 3 wherein it will be noted the blade 30 has been shifted to the right relative to shaft 26. To facilitate yielding and deformation of the yieldable means 52, when comprising a rubber washer, second clamping member 48 is provided with several recesses or spaces, such as annular groove 62 and that deformed by beveled surface 64, into which the yieldable rubber washer can be compressed.

Thus, in Fig. 3, with the blade shifted to the right from the normal position thereof shown in dotted lines, it will be seen that the rubber washer comprising yieldable means 52 has been forced into a portion of groove 62 and the space defined by beveled surface 64. Such deformation of the yieldable means is caused by the movement of sleeve 46 relative to shaft 26, said sleeve being moved directly by blade 30. However, following such movement of the blade occasioned by its engagement with an obstruction, the yieldable means 52 is capable of immediately restoring the blade 30 and sleeve 46 substantially to their normal positions relative to shaft 26. If the blade is subjected to a shock which will occasion only tangential movement relative to shaft 26, the metallic washer 54 will facilitate the movement of the blade relative to the shaft and particularly the yieldable means 52. In order to permit such tangential movement, however, the yieldable means 52 will have to be at least slightly compressed into the spaces such as groove 62 referred to above.

In view of the provision of yieldable means 52 and the function thereof described hereinabove relative to the blade 30 and shaft 26, damage to or impairment of the commutator connections such as embrittlement and fracture thereof will be materially lessened if not substantially eliminated when the same are subjected to shock occasioned by the blade contacting an obstruction. Impairment of the surface of the races of the bearings will also be materially reduced or substantially eliminated.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. In a power driven grass shears including a motor driven shaft and a blade, the combination of mechanism connecting said blade to said shaft so as to be rotated thereby in a plane transverse to the axis of said shaft, said mechanism including yieldable means interengaging said shaft and blade and constructed and arranged to permit limited tangential and radial movement of said blade relative to said shaft, whereby when an obstacle is encountered by said blade while being rotated said yieldable means will substantially prevent the transmission of shock to said shaft.

2. In a power driven grass shears, the combination of a motor driven shaft, a blade having an opening centrally receiving and larger in diameter than said shaft, mechanism connecting said blade to said shaft so as to be rotated thereby in a plane transverse to the axis of said shaft, said mechanism including yieldable means interengaging said shaft and blade and constructed and arranged to permit limited tangential and radial movement of said blade relative to said shaft, and clamping means holding said yieldable means interengaged with said blade, whereby when an obstacle is encountered by said blade while being rotated said yieldable means will substantially prevent the transmission of shock to said shaft.

3. In a power driven grass shears, the combination of a motor driven shaft, a blade having an opening, a sleeve disposed within said opening and centrally receiving said shaft, the inner surface of said sleeve being spaced from said shaft, and mechanism connecting said blade to said shaft so as to be rotated thereby in a plane transverse to the axis of said shaft, said mechanism including yieldable means interengaging said blade and sleeve and said shaft and constructed and arranged to permit limited tangential and radial movement of said blade and sleeve relative to said shaft, whereby when an obstacle is encountered by said blade while being rotated said yieldable means will substantially prevent the transmission of shock to said shaft.

4. In a power driven grass shears, the combination of a motor driven shaft, a clamping member fixed to said shaft, a blade having an opening larger in diameter than and centrally receiving said shaft, one surface of said blade being disposed against said clamping member, a sleeve disposed within said blade opening and surrounding said shaft, the interior of said sleeve being spaced from the periphery of said shaft, circular resilient means surrounding said sleeve and interengaging said blade, a second clamping means secured to said shaft and urging said resilient means into frictional interengagement with said blade and said blade against said clamping member, and a circular flange on said second clamping member surrounding said resilient means to restrain movement thereof in a direction radial to said shaft, said resilient means permitting limited movement of said blade in radial and tangential directions relative to said shaft when an obstacle is encountered by said blade and restoring said blade substantially to its normal position following such movement thereof.

5. In a power driven grass shears, the combination of a motor driven shaft, a clamping member fixed to said shaft, a blade having an opening larger in diameter than and centrally receiving said shaft, one surface of said blade being disposed against said clamping member, a sleeve disposed within said blade opening and surrounding said shaft, the interior of said sleeve being spaced from the periphery of said shaft, a rubber washer surrounding said sleeve and interengaging said blade, a second clamping means secured to said shaft and urging said washer into frictional interengagement with said blade and said blade against said clamping member, and a circular flange on said second clamping member surrounding said washer to restrain movement thereof in a direction radial to said shaft, said washer permitting limited movement of said blade in radial and tangential directions relative to said shaft when an obstacle is encountered by said blade and restoring said blade substantially to its normal position following such movement thereof.

6. In a power driven grass shears, the combination of a motor driven shaft, a clamping member fixed to said shaft, a blade having an opening larger in diameter than and centrally receiving said shaft, one surface of said blade being disposed against said clamping member, a sleeve disposed within said blade opening and surrounding said shaft, the interior of said sleeve being spaced from the periphery of said shaft, a rubber washer surrounding said sleeve and interengaging said blade, a second clamping means secured to said shaft and urging said washer into frictional interengagement with said blade and said blade against said clamping member, said second clamping means having a space therein, and a circular flange on said second clamping member surrounding said washer to restrain movement thereof in a direction radial to said shaft, said washer being expandable into said space in said second clamping means to permit yielding thereof and limited movement of said blade in radial and tangential directions relative to said shaft when an obstacle is encountered by said blade and restoring said blade substantially to its normal position following such movement thereof.

7. In a power driven grass shears, the combination of a motor driven shaft, a clamping member fixed to said shaft, a blade having an opening larger in diameter than and centrally receiving said shaft, one surface of said blade being disposed against said clamping member, a sleeve disposed within said blade opening and surrounding said shaft, the interior of said sleeve being spaced from the periphery of said shaft, a rubber washer surrounding said sleeve, a metal washer surrounding said sleeve and disposed between said rubber washer and blade, a second clamping means secured to said shaft and engaging said rubber washer to urge said metal washer into frictional engagement with said blade and said blade against said clamping member, and a circular flange on said second clamping member surrounding said rubber washer to restrain movement thereof in a direction radial to said shaft, said rubber washer permitting limited movement of said blade in radial and tangential directions relative to said shaft when an obstacle is encountered by said blade and restoring said blade substantially to its normal position following such movement thereof.

8. In a power driven grass shears, the combination of a motor driven shaft, a clamping member fixed to said shaft, a blade having an opening larger in diameter than and centrally receiving said shaft, one surface of said blade being disposed against said clamping member, a sleeve disposed within said blade opening and surrounding said shaft, the interior of said sleeve being spaced from the periphery of said shaft, circular resilient means surrounding said sleeve and interengaging said blade, and a second clamping means secured to said shaft and urging said resilient means into frictional interengagement with said blade and said blade against said clamping member, said resilient means permitting limited movement of said blade in radial and tangential directions relative to said shaft when an obstacle is encountered by said blade and restoring said blade substantially to its normal position following such movement thereof.

JAMES H. GODFREY.

No references cited.